United States Patent
Hyun et al.

(10) Patent No.: US 9,742,576 B2
(45) Date of Patent: Aug. 22, 2017

(54) METHOD FOR PROOF OF PLAY (POP) OF DIGITAL SIGNAGE CONTENT

(71) Applicant: ELECTRONICS AND TELECOMMUNICATIONS RESEARCH INSTITUTE, Daejeon (KR)

(72) Inventors: Wook Hyun, Daejeon (KR); Mi Young Huh, Daejeon (KR); Sung Hei Kim, Daejeon (KR); Shin Gak Kang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 254 days.

(21) Appl. No.: 14/057,464

(22) Filed: Oct. 18, 2013

(65) Prior Publication Data
US 2014/0115079 A1   Apr. 24, 2014

(30) Foreign Application Priority Data

Oct. 19, 2012 (KR) .................. 10-2012-0116343
Sep. 30, 2013 (KR) .................. 10-2013-0116423

(51) Int. Cl.
| | | |
|---|---|---|
| G06F 15/16 | (2006.01) | |
| H04L 12/18 | (2006.01) | |
| H04L 9/08 | (2006.01) | |
| H04L 9/32 | (2006.01) | |

(52) U.S. Cl.
CPC ........ H04L 12/1863 (2013.01); H04L 9/0825 (2013.01); H04L 9/3247 (2013.01); H04L 9/3281 (2013.01)

(58) Field of Classification Search
CPC .... G06Q 30/0209; G06Q 40/12; G06Q 30/02; G06K 9/00154; G06K 9/00161; G06K 9/00167; H04L 12/1863
USPC ............................................. 705/14.4, 14.12
See application file for complete search history.

(56) References Cited

U.S. PATENT DOCUMENTS

| | | | |
|---|---|---|---|
| 6,345,256 B1* | 2/2002 | Milsted ................... | G06F 21/10 705/64 |
| 2002/0112157 A1* | 8/2002 | Doyle ................. | H04L 63/0823 713/157 |
| 2008/0097824 A1 | 4/2008 | Julien et al. | |
| 2010/0045681 A1 | 2/2010 | Weissmueller, Jr. et al. | |
| 2010/0223114 A1* | 9/2010 | Yao ........................ | G06Q 30/02 705/14.12 |
| 2011/0123062 A1* | 5/2011 | Hilu ....................... | G06Q 30/02 382/100 |
| 2011/0125561 A1* | 5/2011 | Marcus .................. | G06Q 20/32 705/14.15 |

(Continued)

*Primary Examiner* — Aftab N. Khan
(74) *Attorney, Agent, or Firm* — Staas & Halsey LLP (57) ABSTRACT

Provided a proof of play (PoP) method of a digital signage terminal and a digital signage server, the PoP method of the digital signage terminal including obtaining a digital signature and a PoP message generation policy provided by a content owner, generating log data comprising information on a play of at least one piece of content, based on the PoP message generation policy, generating a PoP message using information on the digital signature based on the generated log data, and providing the PoP message to at least one of the digital signage server and the content owner.

10 Claims, 9 Drawing Sheets

(56) References Cited

U.S. PATENT DOCUMENTS

2013/0132170 A1\* 5/2013 Yelisetti ................ G06Q 30/02
705/14.4

\* cited by examiner

METHOD FOR PROOF OF PLAY (POP) OF DIGITAL SIGNAGE CONTENT

CROSS-REFERENCE TO RELATED APPLICATIONS

This application claims the benefit of Korean Patent Application No. 10-2012-0116343, filed on Oct. 19, 2012, and Korean Patent Application No. 10-2013-0116423, filed on Sep. 30, 2013, in the Korean Intellectual Property Office, the disclosures of which are incorporated herein by reference.

BACKGROUND

1. Field of the Invention

The present invention relates to a method for proof of play (PoP) of digital signage content, and more particularly, to a method for PoP of digital signage content that may provide a reliability of records on plays of an advertisement and image content in provision of a digital signage service.

2. Description of the Related Art

A digital signage refers to a digital image device that may provide a broadcasting program along with specific information at public places, for example, an airport, a hotel, a hospital, and the like, as a communication tool for inducing marketing, advertisements, training effects, and customer experience for enterprises. The digital signage may collectively supply management platforms or software for controlling main functions to a conventional commercial digital information display (DID).

Information related to plays of conventional digital signage based advertisements and content is transferred to an advertiser, the advertiser may have to rely on a digital signage service provider (SP) for the information. Accordingly, the advertiser may have no choice but to fully trust a report on the information related to the plays of the advertisements and content provided by the digital signage SP, without guarantee of a reliability of the information.

SUMMARY

According to an aspect of the present invention, there is provided a proof of play (PoP) method of a digital signage terminal, the method including obtaining a digital signature and a PoP message generation policy provided by a content owner, generating log data including information on a play of at least one piece of content, based on the PoP message generation policy, generating a PoP message using information on the digital signature based on the generated log data, and providing the PoP message to at least one of a digital signage server and the content owner.

The method may further include obtaining system state information indicating a state of the digital signage terminal.

The generating of the log data may include generating the log data based on the system state information.

The generating of the PoP message may include obtaining the information on the digital signature from a security client.

The method may further include obtaining information for encrypting the log data from the content owner, and encrypting the log data based on the information for encrypting the log data.

The PoP message generation policy may include information on a format and a type of the PoP message.

The method may further include receiving information on a user response to the at least one piece of content.

The generating of the log data may include generating the log data based on the information on the user response.

The method may further include storing, in a local device, at least one of the information on the play of the at least one piece of content, the system state information, and the information on the user response.

The generating of the log data may include extracting at least one of the information on the play of the at least one piece of content, the system state information, and the information on the user response from the local device and generating the log data.

The providing may include integrating PoP messages with respect to a plurality of pieces of content, when the content owner registers the plurality of pieces of content, and transmitting the integrated PoP messages to the content owner.

According to another aspect of the present invention, there is also provided a PoP method of a digital signage server, the method including receiving a PoP message from a digital signage terminal, and transmitting the received PoP message to a content owner.

The transmitting may include integrating PoP messages with respect to a plurality of pieces of content, when the content owner registers the plurality of pieces of content, and transmitting the integrated PoP messages to the content owner.

According to still another aspect of the present invention, there is also provided a digital signage terminal including a digital signature and generation policy obtainer to obtain a digital signature and a PoP message generation policy provided by a content owner, a log data generator to generate log data including information on a play of at least one piece of content based on the PoP message generation policy, a PoP message generator to generate a PoP message using information on the digital signature based on the generated log data, and a PoP message provider to provide the PoP message to at least one of a digital signage server and the content owner.

The digital signage terminal may further include a system state information obtainer to obtain system state information indicating a state of the digital signage terminal.

The log data generator may generate the log data based on the system state information.

The PoP message generator may obtain the information on the digital signature from a security client.

The digital signage terminal may further include an encrypting information obtainer to obtain information for encrypting the log data from the content owner, and an encrypting unit to encrypt the log data based on the information for encrypting the log data.

The PoP message generation policy may include information on a format and a type of the PoP message.

The digital signage terminal may further include a user response detector to receive information on a user response to the at least one piece of content.

The log data generator may generate the log data based on the information on the user response.

The digital signage terminal may further include a storage unit to store, in a local device, at least one of the information on the play of at least one piece of the content, the system state information, and the information on the user response.

The log data generator may extract at least one of the information on the play of the at least one piece of content, the system state information, and the information on the user response from the local device and generate the log data.

The PoP message provider may include a PoP message integrator to integrate PoP messages with respect to a plurality of pieces of content, when the content owner registers the plurality of pieces of content, and an integrated PoP message transmitter to transmit the integrated PoP messages to the content owner.

According to yet another aspect of the present invention, there is also provided a digital signage server including a PoP message receiver to receive a PoP message from a digital signage terminal, and a PoP message transmitter to transmit the received PoP message to a content owner.

The PoP message transmitter may include a PoP message integrator to integrate PoP messages with respect to a plurality of pieces of content, when the content owner registers the plurality of pieces of content, and an integrated PoP message transmitter to transmit the integrated PoP messages to the content owner.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Figure 1:
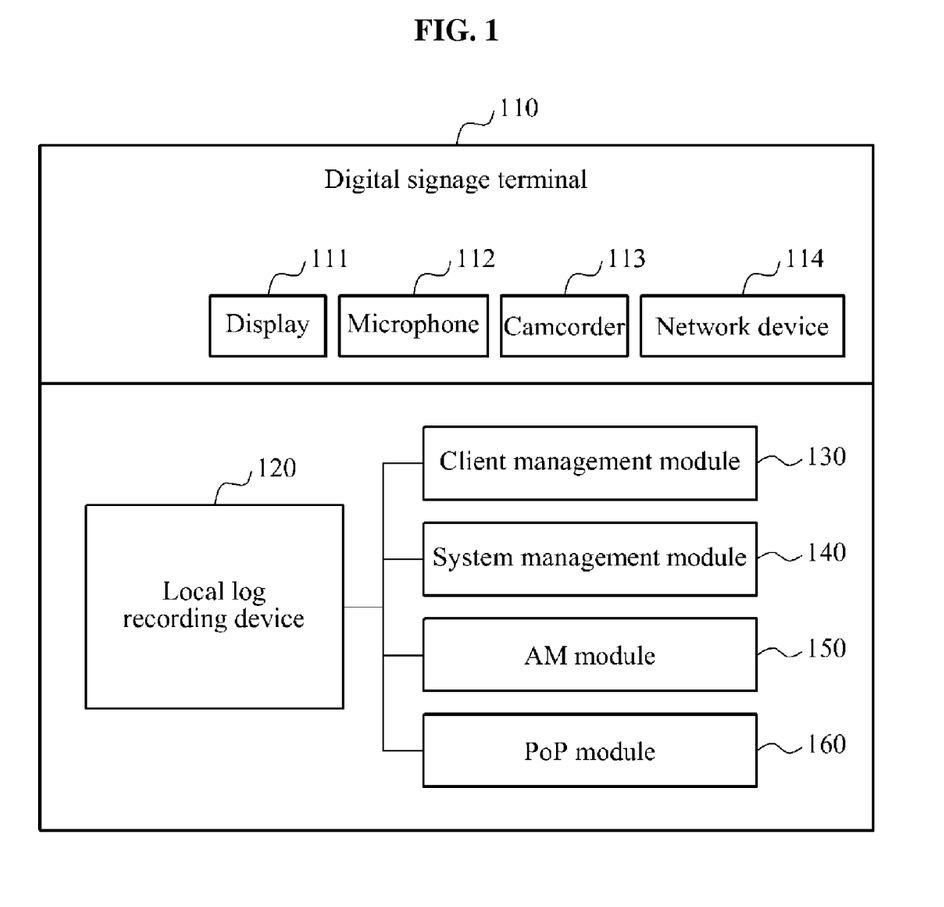
FIG. 1 is a block diagram illustrating a digital signage terminal according to an embodiment of the present invention.

FIG. 1 is a block diagram illustrating a digital signage terminal 110 according to an embodiment of the present invention.

Referring to FIG. 1, the digital signage terminal 110 may include a display 111, a microphone 112, a camcorder 113, a network device 114, a local log recording device 120, for example, a local storage for log data, a client management module 130, a system management module 140, an audience measurement (AM) module 150, and a proof of play (PoP) module 160.

The digital signage terminal 110 may receive content of a content owner, for example, an advertiser, and play the received content. The content owner may register content owned by the content owner with a digital signage service provider (SP) through an advertisement contents provider. The content owned by the content owner may include, for example, an advertisement image, advertisement content, and an advertisement flash. The digital signage terminal 110 may receive content from a digital signage server of the digital signage SP, using the network device 114, and play the received content using the display 111, the microphone 112, and the camcorder 113. In this example, the digital signage terminal 110 may prevent a fabrication in an intermediate stage using a digital signature, and provide the content owner with information regarding whether the content is played in actuality. The operation of the digital signage terminal 110 will be described in detail with reference to FIGS. 3A and 3B.

The client management module 130 may perform a significant function related to a play of the content. In an embodiment, the client management module 130 may include a content management function entity (FE) module, a play control FE module, and a play log FE module. The content management FE module may manage at least one piece of content, and store and maintain information on a play time of each piece of content, and the like. The play control FE module may control a play of content based on a content play policy, for example, a play time, a play sequence, and the like. The play log FE module may create log records related to a play of content.

The system management module 140 may manage a state of the digital signage terminal 110. The system management module 140 may check the state of the digital signage terminal 110, and generate system state information indicating the state of the digital signage terminal 110. In an embodiment, the system management module 140 may perform maintenance of the display 111, the microphone 112, the camcorder 113, and the network device 114.

The AM module 150 may receive information on a user response to at least one piece of content. Information on the user response extracted by the AM module 150 may be utilized for tracking effects of playing content, for example, effects of advertising.

The PoP module 160 may act as a container to perform a PoP function. In an embodiment, the digital signage terminal 110 may call the PoP module 160, for example, a PoP engine, registered for each piece of content to perform the PoP function. The PoP module 160 may perform the PoP function by accessing a log database to extract necessary information, or by accessing each module to query information.

The local log recording device 120 may store log records related to a play of content. In this example, the log records may include at least one of a system log corresponding to the system state information, a play log corresponding to the information on the play of the content, and an AM log corresponding to the information on the user response.

Figure 2:
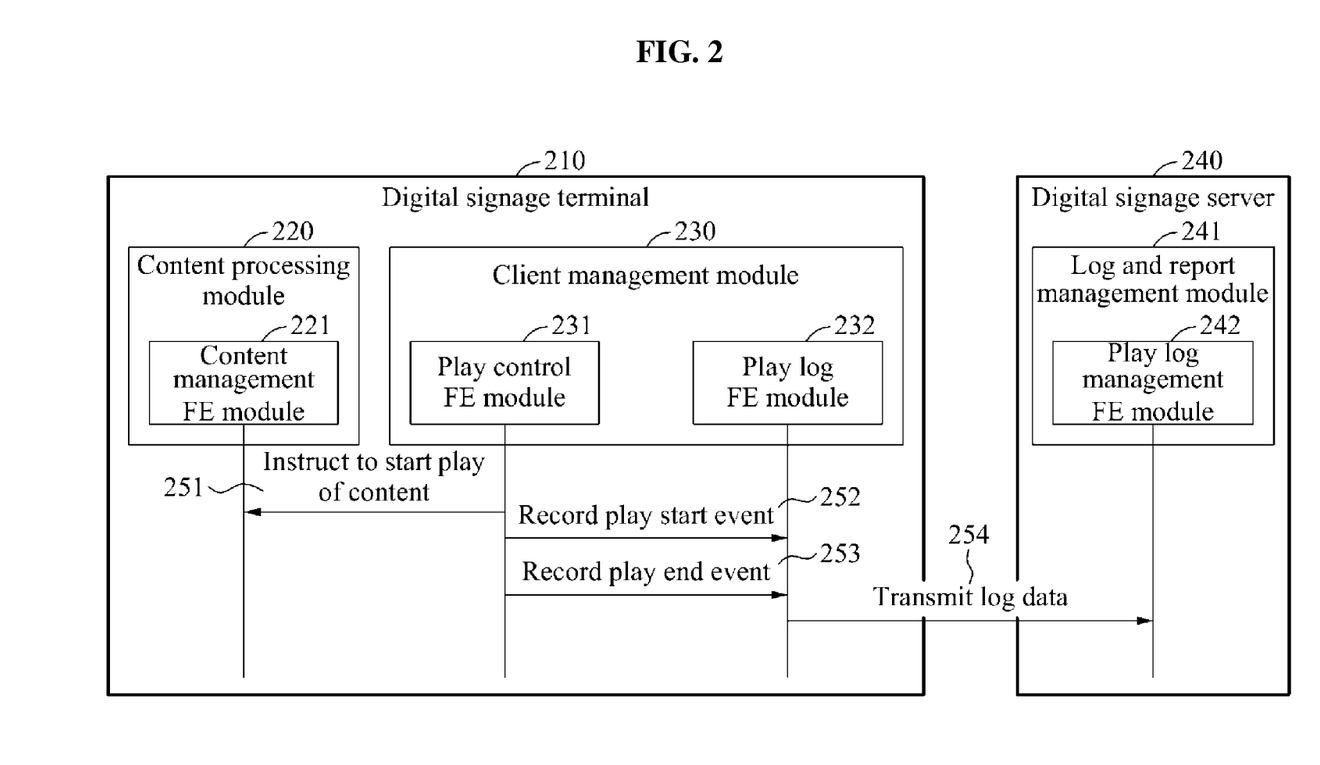
FIG. 2 is a diagram illustrating a digital signage terminal and a digital signage server according to an embodiment of the present invention.

FIG. 2 is a diagram illustrating a digital signage terminal 210 and a digital signage server 240 according to an embodiment of the present invention.

Referring to FIG. 2, the digital signage terminal 210 may include a content processing module 220 and a client management module 230. The content processing module 220 may include a content management FE module 221, and the client management module 230 may include a play control FE module 231 and a play log FE module 232. The digital signage server 240 may include a log and report management module 241. The log and report management module 241 may include a play log management FE module 242.

When the digital signage terminal 210 plays content based on a predetermined play policy, the digital signage terminal 210 may report, to the digital signage server 240, a result of the playing in a form of log data or a play log. The digital signage server 240 may verify whether the content is successfully played, using the log data.

In an embodiment, the digital signage terminal 210 may display a plurality of pieces of content simultaneously on a single monitor. The play control FE module 231 may play the plurality of pieces of content by controlling a layout management FE module (not shown) which manages layouts of a plurality of pieces of content.

In an embodiment, in operation 251, the play control FE module 231 may instruct the content processing module 220 to start a play of content, in order to play specific content. In operation 252, the play control FE module 231 may record a play start event in the play log FE module 232 when the play of the content is started. In operation 253, the play control FE module 231 may record a play end event in the play log FE module 232 after the content is successfully displayed. Although not shown in FIG. 2, when displaying of the content fails, the play control FE module 231 may record a failure event in the play log FE module 232.

The play log FE module 232 may generate log data or a play log message based on the recorded events, and transmit the log data to the play log management FE module 242 of the digital signage server 240, in operation 254.

When a play log event corresponds to an urgent event, the digital signage terminal 210 may generate log data and immediately report the log data to the digital signage server 240. When the play log event does not correspond to an urgent event, the digital signage terminal 210 may integrate log data and report the integrated log data to the digital signage server 240 according to a predefined schedule, rather than immediately reporting the generated log data.

Figure 3A:
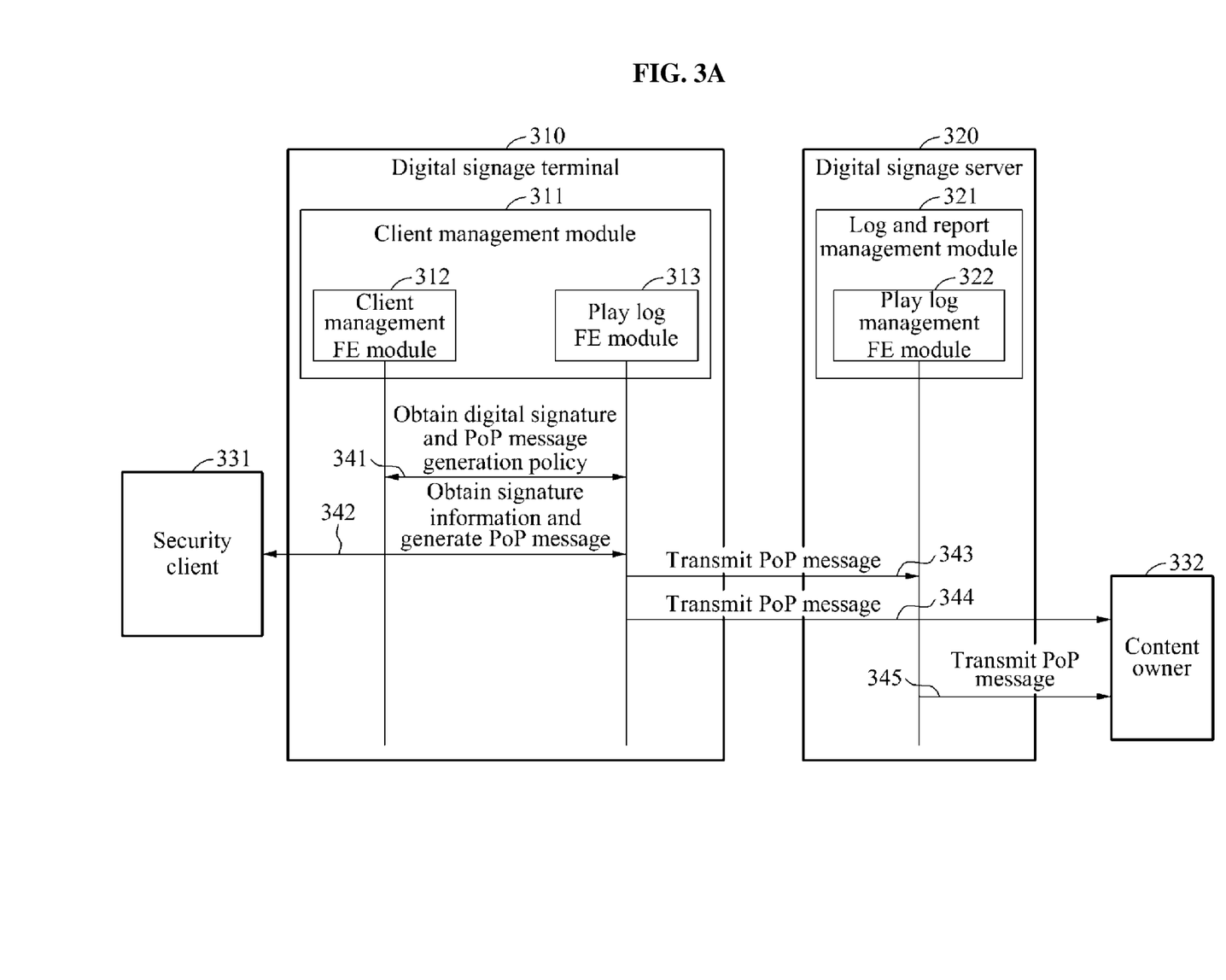
FIG. 3A is a diagram illustrating a PoP method of a digital signage terminal and a digital signage server according to an embodiment of the present invention.

FIG. 3A is a diagram illustrating a PoP method of a digital signage terminal 310 and a digital signage server 320 according to an embodiment of the present invention.

Referring to FIG. 3A, the digital signage terminal 310 may include a client management module 311. The client management module 311 may include a content management FE module 312 and a play log FE module 313. The digital signage server 320 may include a log and report management module 321, and the log and report management module 321 may include a play log management FE module 322.

In an embodiment, a digital signage SP may charge a content owner 332 based on a number of times the content is displayed on the digital signage terminal 310. The content owner 332 may request a PoP, more reliable than simple play records, from the digital signage SP, in order to verify actually played content.

In an embodiment, the content owner 332 may register at least one piece of content and a PoP message generation policy with the digital signage server 320. Such a registration process may be performed during a content registration procedure, at a request of the content owner 332.

In 341, the play log FE module 313 may obtain a digital signature and a PoP message generation policy from the content management FE module 312, to generate a PoP message. The digital signature and the PoP message generation policy may be provided by the content owner 332. The PoP message generation policy may include information on a format and a type of a PoP message. In an embodiment, the PoP message generation policy may indicate a format and a type of specific information included in log data or a play log.

The play log FE module 313 may generate log data including information on a play of content, based on the PoP message generation policy. The play log FE module 313 may request a security client 331 to sign log data having the digital signature provided by the content owner 332. Although it is shown in FIG. 3A that the security client 331 is provided separately from the digital signage terminal 310, the digital signage server 320, and the content owner 332, the security client 331 may be included in the digital signage terminal 310, the digital signage server 320, or the content owner 332. When the security client 331 signs the log data, the play log FE module 313 may generate a PoP message using information on the digital signature obtained from the security client 331 based on the log data, in operation 342.

In addition, the play log FE module 313 may encrypt the log data for security. The play log FE module 313 may obtain information for encrypting the log data from the content owner 332, and encrypt the log data based on the information for encrypting the log data. The play log FE module 313 may generate a PoP message using the information on the digital signature based on the encrypted log data.

In operation 343, the play log FE module 313 may transmit the PoP message to the play log management FE module 322 of the digital signage server 320. In operation 345, the play log management FE module 322 receiving the PoP message may transmit the PoP message to the content owner 332. In this example, when the content owner 332 registers a plurality of pieces of content, the play log management FE module 322 may integrate PoP messages with respect to the plurality of pieces of content. As an example, the play log management FE module 322 may integrate the PoP messages with respect to the plurality of pieces of content according to a predetermined schedule, and transmit the integrated PoP messages to the content owner 332 according to a predetermined schedule. As another example, the play log management FE module 322 may transmit the integrated PoP messages to the content owner 332, for charging.

In operation 344, the play log FE module 313 may transmit the PoP message directly to the content owner 332. In a case in which the PoP message is transmitted directly to the content owner 332, the play log FE module 313 may transmit a PoP message to the content owner 332 each time the PoP message is generated. In this example, the content owner 332 may have a capability to receive PoP messages to be frequently generated.

In an embodiment, when the content owner 332 registers a plurality of pieces of content, the play log FE module 313 may integrate PoP messages with respect to the plurality of pieces of content. In this example, in operation 344, the play log FE module 313 may transmit the integrated PoP messages to the content owner 332. For example, in a case in which the content owner 332 registers the plurality of pieces of content, the play log FE module 313 may transmit PoP messages with respect to the plurality of pieces of content to the content owner 332 each time the PoP messages are generated with respect to the plurality of pieces of content, or may integrate the PoP messages with respect to the plurality of pieces of content and transmit the integrated PoP messages to the content owner 332.

Figure 3B:
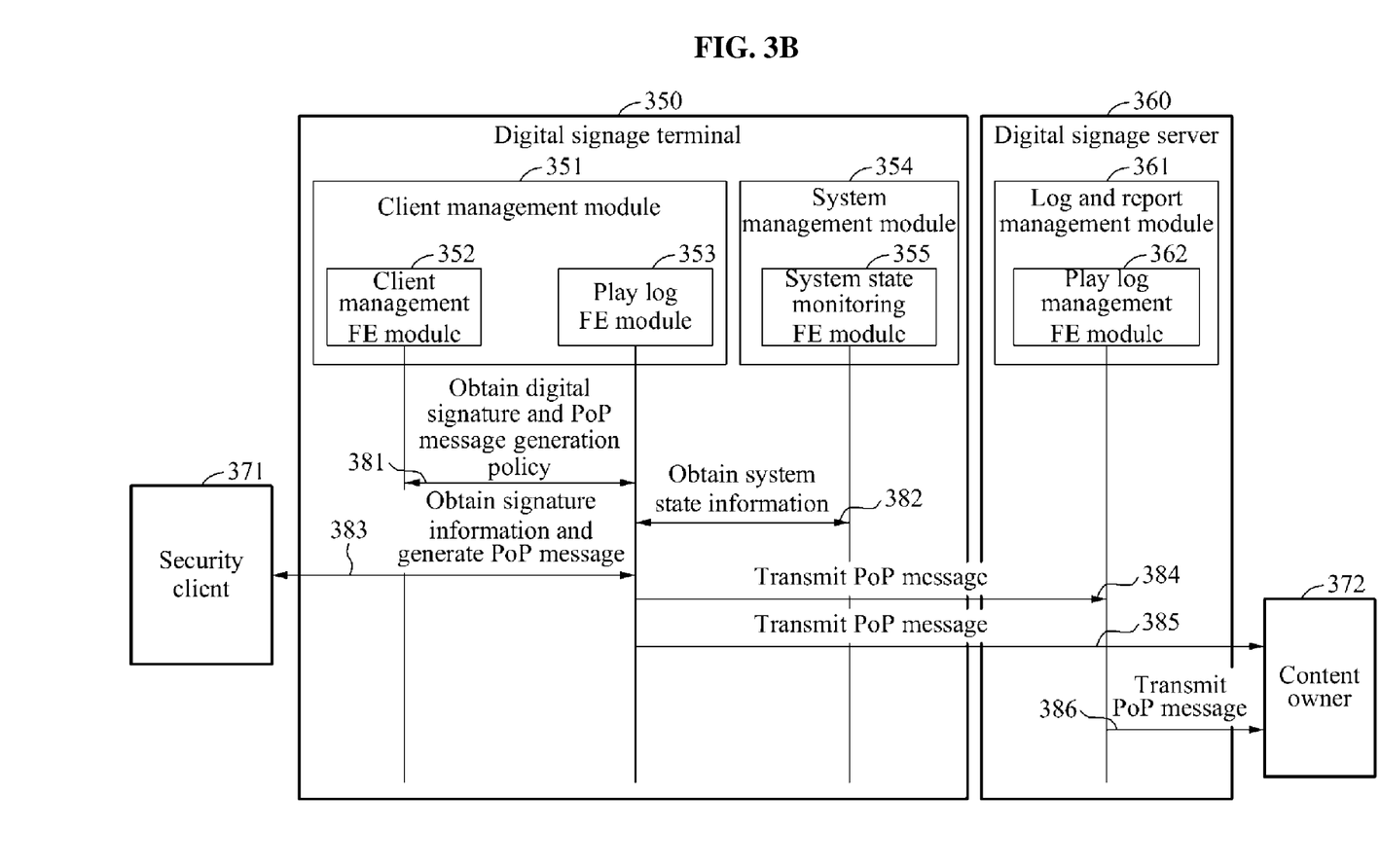
FIG. 3B is a diagram illustrating a PoP method of a digital signage terminal and a digital signage server according to another embodiment of the present invention.

FIG. 3B is a diagram illustrating a PoP method of a digital signage terminal 350 and a digital signage server 360 according to another embodiment of the present invention.

Referring to FIG. 3B, the digital signage terminal 350 may include a client management module 351 and a system management module 354. The client management module 351 may include a content management FE module 352 and a play log FE module 353, and the system management module 354 may include a system state monitoring FE module 355. The digital signage server 360 may include a log and report management module 361, and the log and report management module 361 may include a play log management FE module 362.

In operation 381, the play log FE module 353 may obtain a digital signature and a PoP message generation policy form the content management FE module 352, to generate a PoP message.

While the digital signage terminal 350 is displaying content, whether the digital signage terminal 350 is operated normally is to be checked. For example, a monitor blackout may occur while the digital signage terminal 350 is displaying content. Accordingly, the system state monitoring FE module 355 may monitor a state of the digital signage terminal 350. In operation 382, the play log FE module 353 may obtain system state information indicating the state of the digital signage terminal 350 from the system state monitoring FE module 355.

The play log FE module 353 may generate log data including information on a play of content, based on the PoP message generation policy. In an embodiment, the play log FE module 353 may generate log data based on the system state information.

The play log FE module 353 may request a security client 371 to sign log data having the digital signature provided by the content owner 332. Although it is shown in FIG. 3B that the security client 371 is provided separately from the digital signage terminal 350, the digital signage server 360, and a content owner 372, the security client 371 may be included in the digital signage terminal 350, the digital signage server 360, or the content owner 372. When the security client 371 signs the log data, the play log FE module 353 may generate a PoP message using information on the digital signature obtained from the security client 371 based on the log data, in operation 383.

In operation 384, the play log FE module 353 may transmit the PoP message to the play log management FE module 362 of the digital signage server 360. In operation 386, the play log management FE module 362 receiving the PoP message may transmit the PoP message to the content owner 372. In this example, when the content owner 372 registers a plurality of pieces of content, the play log management FE module 362 may integrate PoP messages with respect to the plurality of pieces of content. As an example, the play log management FE module 362 may integrate the PoP messages with respect to the plurality of pieces of content according to a predetermined schedule, and transmit the integrated PoP messages to the content owner 372 according to a predetermined schedule. As another example, the play log management FE module 362 may transmit the integrated PoP messages to the content owner 372, for charging.

In operation 385, the play log FE module 353 may transmit the PoP message directly to the content owner 372. In a case in which the PoP message is transmitted directly to the content owner 372, the play log FE module 353 may transmit a PoP message to the content owner 372 each time the PoP message is generated. In this example, the content owner 372 may have a capability to receive PoP messages to be frequently generated.

In an embodiment, when the content owner 372 registers a plurality of pieces of content, the play log FE module 353 may integrate PoP messages with respect to the plurality of pieces of content, and transmit the integrated PoP messages to the content owner 372, in operation 385.

Figure 4:
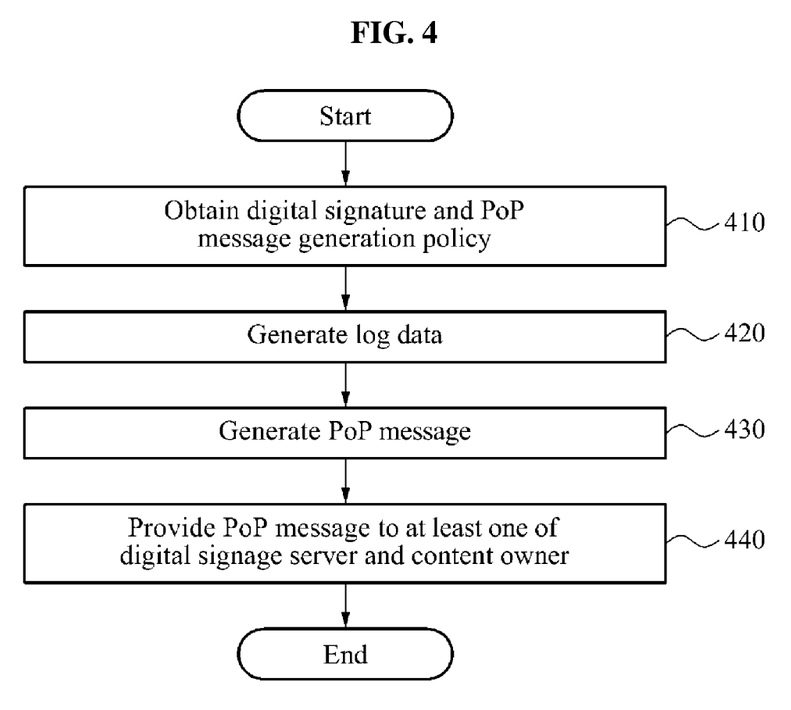
FIG. 4 is a flowchart illustrating a PoP method of a digital signage terminal according to an embodiment of the present invention.

FIG. 4 is a flowchart illustrating a PoP method of a digital signage terminal according to an embodiment of the present invention.

Referring to FIG. 4, in operation 410, the digital signage terminal may obtain a digital signature and a PoP message generation policy provided by a content owner. The PoP message generation policy may include information on a format and a type of a PoP message.

The content owner may register at least one piece of content with a digital signage SP. In this example, the content owner may transmit the digital signature and the PoP message generation policy to a digital signage server of the digital signage SP. In an embodiment, the content owner may transmit a public key to be used for encrypting log data to the digital signage server. The digital signage server may register the received at least one piece of content, the PoP message generation policy, and the public key with the digital signage terminal. In order to support various heterogeneous terminal devices, modules included in the digital signage terminal may be implemented based on at least one of hypertext mark-up language (HTML) 5, Java, and WebKit. Here, WebKit refers to an open source application program framework providing a foundation for creating web browsers.

In operation 420, the digital signage terminal may generate log data including information on a play of the at least one piece of content, based on the PoP message generation policy. The digital signage terminal may obtain system state information indicating a state of the digital signage terminal, and generate the log data based on the obtained system state information. In addition, the digital signage terminal may receive information on a user response to the at least one piece of content, and generate the log data based on the information on the user response. Furthermore, the digital signage terminal may store, in a local device, at least one of the information on the play of the at least one piece of content, the system state information, and the information on the user response. The digital signage terminal may extract, from the local device, at least one of the information on the play of the at least one piece of content, the system state information, and the information on the user response, and generate the log data.

In an embodiment, the log data may include at least one of a log time of at least one piece of content, information on a play, system state information, and information on a user response.

The digital signage terminal may obtain information for encrypting the log data from the content owner, and encrypt the log data based on the information for encrypting the log data. For example, the digital signage terminal may obtain a public key from the content owner, and encrypt the log data using a public key encryption scheme.

In operation 430, the digital signage terminal may generate a PoP message with respect to the generated log data based on information on the digital signature. The digital signage terminal may obtain the information on the digital signature from a security client, and generate the PoP message based on the obtained information on the digital signature. In an embodiment, the security client may sign the log data using a public key, and the digital signage terminal may obtain the information on the digital signature from the security client and generate the PoP message.

In order to prepare for a loss of a PoP message, the digital signage terminal may incorporate a message serial number in the PoP message. Accordingly, the PoP message may include the message serial number, the log data, and the digital signature.

In operation 440, the digital signage terminal may provide the PoP message to at least one of the digital signage server and the content owner.

When the digital signage terminal transmits the PoP message to the digital signage server, the digital signage server may transmit the PoP message to the content owner. In this example, when the content owner registers a plurality of pieces of content, the digital signage server may integrate PoP messages with respect to the plurality of pieces of content, and transmit the integrated PoP messages to the content owner.

When the digital signage terminal transmits the PoP message directly to the content owner, rather than through the digital signage server, the PoP message may be encrypted using the public key encryption scheme. In this example, the content owner may verify the PoP message using a private key.

In an embodiment, the digital signage terminal may transmit the PoP message directly to the content owner. In a case in which the content owner registers a plurality of pieces of content, the digital signage terminal may transmit PoP messages with respect to the plurality of pieces of content to the content owner each time the PoP messages are generated with respect to the plurality of pieces of content, or may integrate the PoP messages with respect to the plurality of pieces of content and transmit the integrated PoP messages to the content owner.

Figure 5:
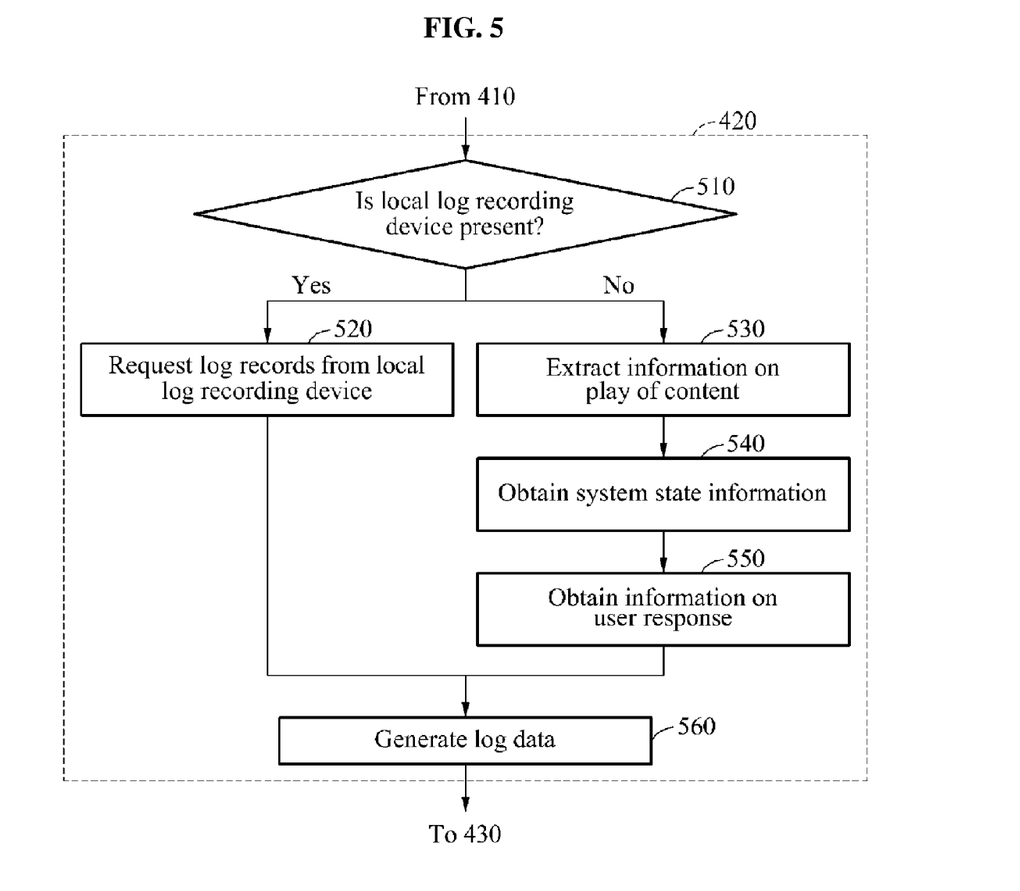
FIG. 5 is a flowchart illustrating operation 420 of the method of FIG. 4.

FIG. 5 is a flowchart illustrating operation 420 of the method of FIG. 4. Referring to FIG. 5, in operation 510, the digital signage terminal may determine whether a local log recording device is present. The local log recording device refers to a device configured to store log records related to a play of at least one piece of content.

When a local log recording device is present, the digital signage terminal may request log records from the local log recording device, in operation 520. For example, the digital signage terminal may extract, from the local log recording device, at least one of information on the play of the at least one piece of content, system state information, and information on a user response.

When a local log recording device is absent, the digital signage terminal may obtain information on a play of at least one piece of content from a client management module, in operation 530. The digital signage terminal may obtain system state information from a system management module, in operation 540. The digital signage terminal may obtain information on a user response from an AM module, in operation 550. Accordingly, the digital signage terminal may request information on log data directly from each module, rather than through the local log recording device.

In operation 560, the digital signage terminal may generate log data. The digital signage terminal may generate the log data, based on at least one of the information on the play of the at least one piece of content, the system state information, and the information on the user response.

Figure 6:
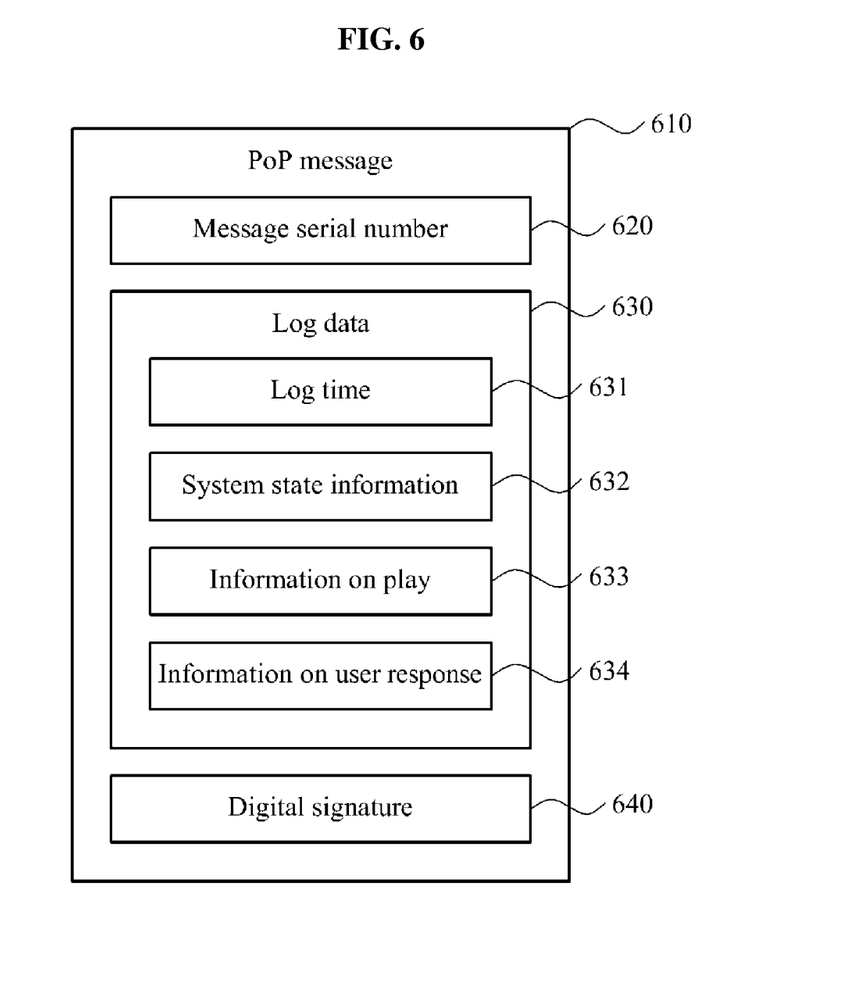
FIG. 6 is a block diagram illustrating a PoP message according to an embodiment of the present invention.

FIG. 6 is a block diagram illustrating a PoP message 610 according to an embodiment of the present invention.

Referring to FIG. 6, the PoP message 610 may include a message serial number 620, log data 630, and a digital signature 640.

The message serial number 620 may be provided for preparation for a loss of the PoP message 610. Each time a PoP message is generated, the message serial number 620 may increase. The log data 630 may include a log time 631, system state information 632, information 633 on a play, and information 634 on a user response. The log time 631 may include a start time and an end time at which logs are recorded. The system state information 632 may include information on a system state, for example, information regarding whether a digital signage terminal is operated normally, in particular, information regarding whether a display is turned on or off, and the like. The information 633 on the play may include information related to a play of content, for example, an identifier of content being played, a play start time, and a play stop time. The information 634 on the user response may include information on a characteristic of a user, a number of users, and a user response, for example, an audience response, to content.

The digital signature 640 may be obtained from a content owner. The digital signage terminal may obtain information on the digital signature 640 from a security client, and generate the PoP message 610 using the information on the digital signature 640.

Figure 7:
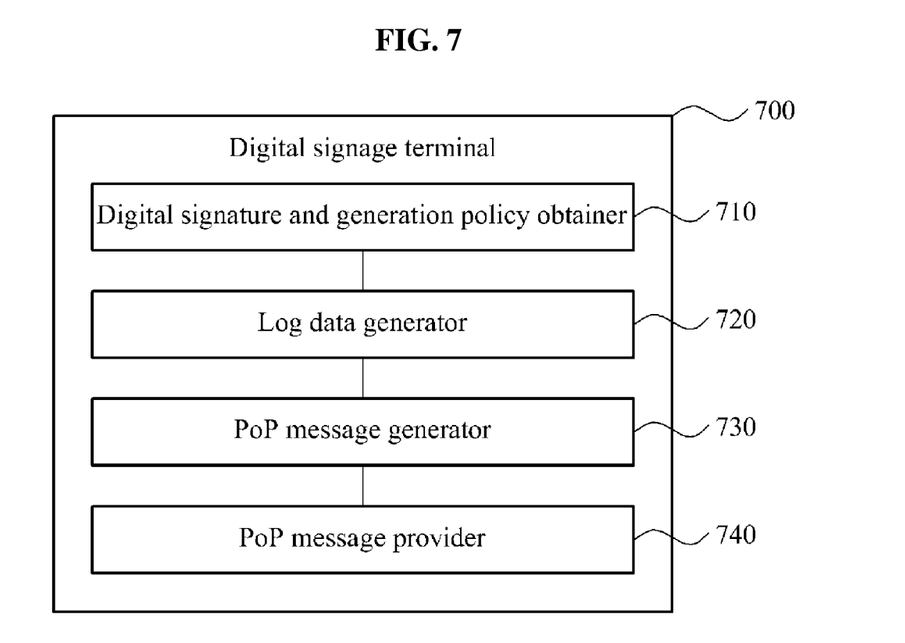
FIG. 7 is a block diagram illustrating a digital signage terminal according to another embodiment of the present invention.

FIG. 7 is a block diagram illustrating a digital signage terminal 700 according to another embodiment of the present invention.

Referring to FIG. 7, the digital signage terminal 700 may include a digital signature and generation policy obtainer 710, a log data generator 720, a PoP message generator 730, and a PoP message provider 740. In an embodiment, the digital signature and generation policy obtainer 710, the log data generator 720, the PoP message generator 730, and the PoP message provider 740 may be included in a play log FE module (not shown) belonging to a client management module (not shown) of the digital signage terminal 700.

The digital signature and generation policy obtainer 710 may obtain a digital signature and a PoP message generation policy provided by a content owner.

The log data generator 720 may generate log data including information on a play of at least one piece of content, based on the PoP message generation policy.

The PoP message generator 730 may generate a PoP message with respect to the generated log data, based on information on the digital signature.

The PoP message provider 740 may provide the PoP message to at least one of a digital signage server and the content owner.

The descriptions provided with reference to FIGS. 1 through 6 may be applied to the digital signage terminal 700 and thus, duplicated descriptions will be omitted for conciseness.

Figure 8:
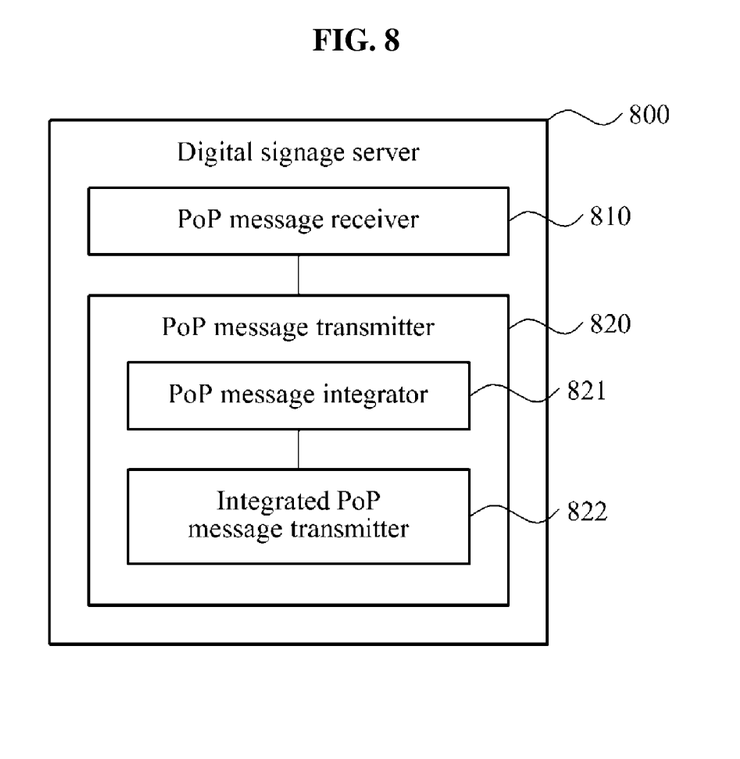
FIG. 8 is a block diagram illustrating a digital signage server according to an embodiment of the present invention.

FIG. 8 is a block diagram illustrating a digital signage server 800 according to an embodiment of the present invention.

Referring to FIG. 8, the digital signage server 800 may include a PoP message receiver 810, and a PoP message transmitter 820. In an embodiment, the PoP message receiver 810 and the PoP message transmitter 820 may be included in a play log management FE module (not shown) belonging to a log and report management module (not shown) of the digital signage server 800.

The PoP message receiver 810 may receive a PoP message from a digital signage terminal.

The PoP message transmitter 820 may transmit the received PoP message to a content owner.

The PoP message transmitter 820 may include a PoP message integrator 821, and an integrated PoP message transmitter 822.

The PoP message integrator 821 may integrate PoP messages with respect to a plurality of pieces of content, when the content owner registers the plurality of pieces of content.

The integrated PoP message transmitter 822 may transmit the integrated PoP messages to the content owner.

The descriptions provided with reference to FIGS. 1 through 6 may be applied to the digital signage server 800 and thus, duplicated descriptions will be omitted for conciseness.

The methods according to the above-described exemplary embodiments of the present invention may be recorded in non-transitory computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A proof of play (PoP) method of a digital signage terminal, the method comprising:
   receiving a content provided by a content owner;
   obtaining a digital signature and a PoP message generation policy provided by the content owner, wherein the PoP message generation policy includes preferences of the content owner that are applied to the PoP message when the POP message is generated in the digital signage terminal;
   playing at least one piece of the content provided by the content owner;
   generating log data comprising information on a play of the at least one piece of the content, based on the PoP message generation policy;
   generating a PoP message based on the generated log data according to the PoP message generation policy provided by the content owner;
   integrating PoP messages that use the same digital signature provided by the content owner when the content owner registers a plurality of pieces of content;
   encrypting the integrated POP messages by using the digital signature provided by the content owner; and
   transmitting the encrypted PoP messages to at least one of a digital signage server and the content owner,
   wherein the generating of the PoP message comprises obtaining a certification of the POP message with the digital signature from a security client device.

2. The method of claim 1, wherein the PoP message generation policy comprises information on a format and a type of the PoP message.

3. The method of claim 1, further comprising:
   obtaining system state information indicating a state of the digital signage terminal,
   wherein the generating of the log data comprises generating the log data based on the system state information.

4. The method of claim 3, further comprising:
   receiving information on a user response to the at least one piece of content,
   wherein the generating of the log data comprises generating the log data based on the information on the user response.

5. The method of claim 4, further comprising:
   storing, in a local device, at least one of the information on the play of the at least one piece of content, the system state information, and the information on the user response,
   wherein the generating of the log data comprises extracting at least one of the information on the play of the at least one piece of content, the system state information, and the information on the user response from the local device and generating the log data.

6. A digital signage terminal that:
   receives a content provided by a content owner;
   obtains a proof of play (PoP) message generation policy and a digital signature provided by the content owner, wherein the PoP message generation policy includes preferences of the content owner that are applied to the PoP message when the POP message is generated in the digital signage terminal;
   plays at least one piece of the content provided by the content owner;
   generates log data comprising information on a play of the at least one piece of the content based on the PoP message generation policy;
   generates a PoP message based on the generated log data according to the PoP message generation policy provided by the content owner;
   integrates PoP messages that use the same digital signature provided by the content owner when the content owner registers a plurality of pieces of content;
   encrypts the integrated POP messages by using the digital signature provided by the content owner; and
   provides the encrypted PoP message to at least one of a digital signage server and the content owner,
   wherein the digital signage terminal further obtains the information on the digital signature from a security client device.

7. The digital signage terminal of claim 6, wherein the PoP message generation policy comprises information on a format and a type of the PoP message.

8. The digital signage terminal of claim 6, wherein the digital signage terminal further: obtains system state information indicating a state of the digital signage terminal, and generates the log data based on the system state information.

9. The digital signage terminal of claim 8, wherein the digital signage terminal further:
   receives information on a user response to the at least one piece of content, and
   generates the log data based on the information on the user response.

10. The digital signage terminal of claim 9, wherein the digital signage terminal further:

stores, in a local device, at least one of the information on the play of at least one piece of the content, the system state information, and the information on the user response, and extracts at least one of the information on the play of the at least one piece of content, the system state information, and the information on the user response from the local device and generates the log data.

\* \* \* \* \*